United States Patent
Herz (10) Patent No.: US 8,907,975 B1
(45) Date of Patent: Dec. 9, 2014

(54) SAMPLED DIGITAL VIDEO COMMUNICATION SYSTEM AND METHOD

(75) Inventor: William Samuel Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 415 days.

(21) Appl. No.: 11/300,763

(22) Filed: Dec. 13, 2005

(51) Int. Cl.
  *G09G 5/02* (2006.01)
  *H04N 11/20* (2006.01)
  *H04N 7/12* (2006.01)

(52) U.S. Cl.
  USPC ...... 345/604; 345/603; 348/453; 375/240.01; 375/240.21

(58) Field of Classification Search
  USPC ............. 345/604, 603; 348/453, E7.005; 375/240.01, 240.21
  See application file for complete search history.

(56) References Cited

U.S. PATENT DOCUMENTS

| | | | | |
|---|---|---|---|---|
| 6,639,628 B1 * | 10/2003 | Lee et al. | ................... | 348/223.1 |
| 6,940,523 B1 * | 9/2005 | Evoy | .............. | 345/604 |
| 7,136,417 B2 * | 11/2006 | Rodriguez | ............. | 375/240.29 |
| 2004/0252891 A1 * | 12/2004 | Sasaki | ........... | 382/232 |
| 2005/0024384 A1 * | 2/2005 | Evans et al. | ................... | 345/604 |
| 2005/0206784 A1 * | 9/2005 | Li et al. | ......... | 348/441 |

* cited by examiner

*Primary Examiner* — Tize Ma (57) ABSTRACT

Digital video communication system and method facilitate conservation of communication bandwidth are presented. A present invention method forwards sampled chrominance data to other components in the system. Pixel chrominance values are sampled in accordance with the sampling scheme. The sampled chrominance values (e.g., 422, 420, 411, etc.) are forwarded to another component. For example, a graphics processing unit performs sampling operations and forwards the chrominance sampled information to another component (e.g., a board, a display, etc.). The graphics processing unit can also perform color space conversion before forwarding the chrominance sampled information to the other component. The other component performs up-sampling. For example, a display can perform the up-sampling to generate synthesized full RGB values. The sampled chrominance data can be further compressed (e.g., MPEG, WMV, etc.) before forwarding the sampled chrominance data and before performing the up-sampling.

18 Claims, 6 Drawing Sheets

SAMPLED DIGITAL VIDEO COMMUNICATION SYSTEM AND METHOD

FIELD OF THE INVENTION

The present invention relates to the digital video presentations. More particularly the present invention relates to digital video communication systems and methods.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of digital video presentations. The digital video presentations typically provide information in a format that humans find easy to observe and digest significant amounts of data in relatively short periods of time. Some traditional approaches to information communication subscribe to the notion that "a picture is worth a thousand words". However, digital video presentations are typically data intensive. Communicating large amounts of data between components of a digital video system can consume significant resources and take a significant amount of time.

Rapid communication and processing of information is often critical for desirable video presentations. Generally, a certain level of flow or speed in the information presentation is required for the application to perform properly. Delays in communicating and/or processing video information can have significant detrimental impacts on video presentations. Glitches or delays in video streaming can diminish user experience and/or interaction with the video.

Digital video information typically includes information associated with a three dimensional scene in the world coordinate system mapped for two dimensional projection (e.g., on a display screen). In most digital video systems an image is represented as a raster (an array) of logical picture elements (pixels). Parameter values are typically assigned to each pixel and the parameter values determine the nature of the projection on the display screen. The parameter values are digital values corresponding to certain attributes of the image (e.g. color, depth, etc.) measured over a small area of the image represented by a pixel. The parameter values are usually represented by bits associated with binary logic values (e.g., a string of ones and zeroes) that are communicated between components of a system. Typically each graphical image is represented by thousands of combined pixels. Communicating information for each pixel is very data intensive and typically consumes a significant amount of the communication resources in a digital video system.

Communication resources in video systems typically have physical constraints that place upper limits on communication bandwidth (e.g., the amount of information that can be communicated in a predetermined amount of time). For example, the amount of digital information (e.g., bits per second, bytes per second, etc.) that can be communicated on the number of paths or channels in a communications bus usually has an upper limit. Traditional attempts at increasing bandwidth can include increasing the physical resources of the system. However, increasing the physical resources of a system is often expensive and can detrimentally impact other desirable features of a system. For example, the amount of physical resources that are included as part of a mobile system (e.g., laptops, hand held devices, cell phones, etc.) is often limited by size and/or weight constraints directed to maintaining mobility.

SUMMARY

A digital video communication system and method are presented in accordance with embodiments of the present invention. In one embodiment of the present invention, digital video communication systems and methods are utilized to facilitate conservation of communication bandwidth. The conservation of bandwidth can enable more information to be communicated to a display in a shorter period of time. For example, existing interfaces can be mapped to handle an increase in byte size and/or metadata can be communicated in parallel with graphics information.

In one embodiment, a present invention method forwards sampled chrominance data to other components in the system. Pixel chrominance values are sampled in accordance with the sampling scheme. The sampled chrominance values (e.g., 4:2:2, 4:2:0, 4:1:1, etc.) are forwarded to another component. For example, a graphics processing unit performs sampling operations and forwards the chrominance sampled information to another component (e.g., a board, a display, etc.). The graphics processing unit can also perform color space conversion before forwarding the chrominance sampled information to the other component. The other component performs up-sampling. For example, a display can perform the up-sampling to generate synthesized full RGB values. The sampled chrominance data can be further compressed (e.g., MPEG, WMV, etc.) before forwarding the sampled chrominance data and before performing the up-sampling.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Present invention systems and methods facilitate efficient and effective communication of digital video information. Embodiments of the present invention can facilitate conservation and optimization of bandwidth for processing and the channel, and can also enable the channel to accommodate higher bandwidth signals. Digital video communication systems and methods of the present invention can also allow existing interfaces to be mapped to handle increased byte size (#bits) per component. The present invention can also be used to enhance flexible utilization of processing resources.

Figure 1:
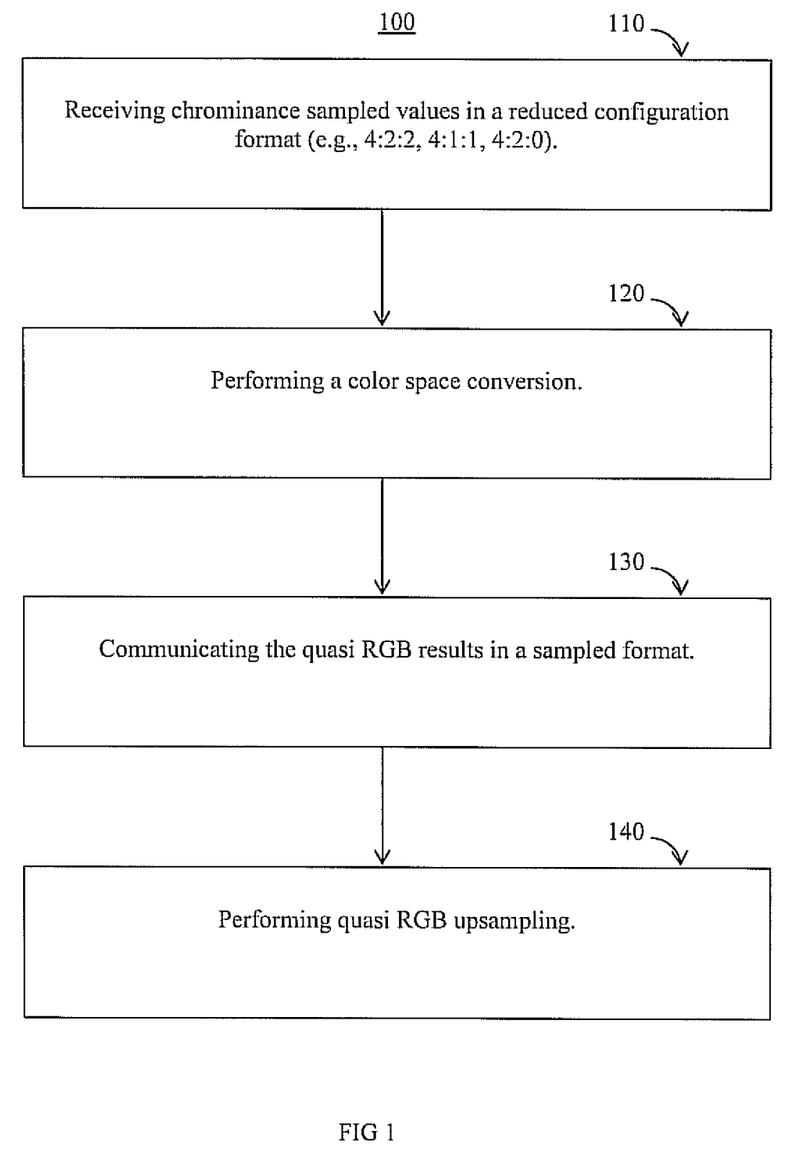
FIG. 1 is a flow chart of an exemplary digital video communication method in accordance with one embodiment of the present invention.

FIG. 1 is a flow chart of exemplary digital video communication method 100 in accordance with one embodiment of the present invention. Digital video communication method 100 facilitates conservation of communication resources bandwidth in digital video systems. Embodiments of communication method 100 permit chrominance sub-sampled color space converted data to be communicated between components. In one exemplary implementation, color space conversion is performed in one component and up-sampling is performed in another.

In step 110, chrominance sub-sampled values are received in a reduced configuration format (e.g., 4:2:2, 4:1:1, 4:2:0). In one embodiment, the chrominance sub-sampled values include a single set of chrominance values assigned to a predetermined number of adjacent pixels. The chrominance sub-sampled values include a luminance pixel value for each predetermined adjacent pixel and a common red color chrominance difference value for the set of pixels and a common blue color chrominance difference value for the set of pixels. Various chrominance sampling schemes are described below. In one embodiment, the chrominance sampling process is executed in accordance with an HDTV scheme.

A color space conversion is performed on the received chrominance sub-sampled information in step 120. In one embodiment, the color space conversion is performed before executing steps 130 and 140. The color space conversion can be performed in the same processing module as the sampling. In one exemplary implementation, red-green-blue (RGB) pixels are filtered among vertically and/or horizontally adjacent pixels to match a chrominance sub-sampling scheme. In one embodiment of digital video communication method 100, color space conversion is performed in a processing module performing the chrominance sampling process and the up-sampling is performed in another processing module.

In step 130, the results are communicated in a color space converted sub-sampled format (e.g., 4:2:2, 4:2:0, 4:2:1, etc). In one embodiment, the results are communicated in the color space converted sub-sampled format from a graphics processing unit to another component. For example, the results are communicated in the color space converted sub-sampled format from a graphics processing unit to a display device. In one exemplary implementation a communication interface is mapped to forward an increased byte size.

In step 140, an up-sampling process is performed after communication. In one embodiment, the up-sampling process generates synthetic full red green blue (RGB) values. For example, a 4:4:4 full bandwidth format can be generated.

In one embodiment a 4:2:0 chrominance sub-sampling scheme is utilized in which sub-sampling of chrominance occurs vertically and horizontally. For example, the first 5 pixels of line 1 and line 2 of a raster can have the following structure in a 4:4:4 format:

Line1
$P_{1,1}=Y_{1,1}\, Cr_{1,1}\, Cb_{1,1}$
$P_{2,1}=Y_{2,1}\, Cr_{2,1}\, Cb_{2,1}$
$P_{3,1}=Y_{3,1}\, Cr_{3,1}\, Cb_{3,1}$
$P_{4,1}=Y_{4,1}\, Cr_{4,1}\, Cb_{4,1}$
$P_{5,1}=Y_{5,1}\, Cr_{5,1}\, Cb_{5,1}$
Line 2
$P_{1,2}=Y_{1,2}\, Cr_{1,2}\, Cb_{1,2}$
$P_{2,2}=Y_{2,2}\, Cr_{2,2}\, Cb_{2,2}$
$P_{3,2}=Y_{3,2}\, Cr_{3,2}\, Cb_{3,2}$
$P_{4,2}=Y_{4,2}\, Cr_{4,2}\, Cb_{5,2}$
$P_{5,2}=Y_{5,2}\, Cr_{5,2}\, Cb_{5,2}$ Sub-sampling to 4:2:0 removes the chrominance values from every second pixel and the values from surrounding pixels are utilized to synthesis the values after communication. In the present example, the bits associated with $Cr_{2,1}$ $Cb_{2,1}$, and $Cr_{3,1}\, Cb_{3,1}$ are "removed" as shown in following modification of the pixel values:

Line1
$P_{1,1}=Y_{1,1}\, Cr_{1,1}\, Cb_{1,1}$
$P_{2,1}=Y_{2,1}$ $P_{3,1} = Y_{3,1} \, Cr_{3,1} \, Cb_{3,1}$
$P_{4,1} = Y_{4,1}$
$P_{5,1} = Y_{5,1} \, Cr_{5,1} \, Cb_{5,1}$
Line 2
$P_{1,2} = Y_{1,2} \, Cr_{1,2} \, Cb_{1,2}$
$P_{2,2} = Y_{2,2}$
$P_{3,2} = Y_{3,2} \, Cr_{3,2} \, Cb_{3,2}$
$P_{4,2} = Y_{4,2}$
$P_{5,2} = Y_{5,2} \, Cr_{5,2} \, Cb_{5,2}$ The remaining sub-sampled values are quasi color space converted into following matrix. The resulting quasi-RGB sub-sampled information has less bits than a conventional full bandwidth RGB resulting from traditional color space conversion sequence. For example, the present chrominance sub-sampled 4:2:0 formatted pixels (P) from above are color space converted into the following quasi-RGB sub-sampled pixel values (P') in which each P' value includes 12 bits per pixel as follows.

Line1 $P'_{1,1} = G_{1,1} \, R_{1,1} \, B_{1,1}$
$P'_{2,1} = G_{2,1} \, R_{2,1} \, B_{2,1}$
$P'_{3,1} = G_{3,1} \, R_{3,1} \, B_{3,1}$
$P'_{4,1} = G_{4,1} \, R_{4,1} \, B_{4,1}$
$P_{5,1} = G_{5,1} \, R_{5,1} \, B_{5,1}$
Line 2
$P'_{1,2} = G_{1,2} \, R_{1,2} \, B_{1,2}$
$P'_{2,2} = G_{2,1} \, R_{2,1} \, B_{2,1}$
$P'_{3,2} = G_{3,2} \, R_{3,2} \, B_{3,2}$
$P'_{42} = G_{4,2} \, R_{4,1} \, B_{4,1}$
$P'_{5,2} = G_{5,2} \, R_{5,2} \, B_{5,2}$ These quasi-RGB sub-sampled values are communicated across a "full bandwidth" RGB communication interface (e.g., between a GPU and a board or a display device). For example, the 12 bits of the present 4:2:0 quasi-RGB sub-sampled P' values are communicated across an otherwise "full bandwidth" RGB 24 bit communication interface. Thus, there are effectively 12 extra or spare bits of bandwidth on the interface that can be utilized for communicating other information or communicating the next quasi-RGB sub-sampled pixel. For example, instead of forwarding a single full RGB pixel $P_{1,1} = G_{1,1} \, R_{1,1} \, B_{1,1}$ including 24 bits the two 12 bits quasi-RGB sub-sampled pixels $P'_{1,1} = G_{1,1} \, R_{1,1} \, B_{1,1}$ and $P'_{2,1} = G_{2,1} \, R_{2,1} \, B_{121}$ are communicated.

After these values are communicated across an interface (e.g., to either a board or display device) the pixels are then filtered or "up-sampled" among vertically and horizontally adjacent pixels to match conventional chroma up sampling and color space conversion. The synthesized pixels (P") would again have a full bandwidth 4:4:4 RGB 24 bit configuration with 8 bits per component. It is appreciated that P'"1 can be a byproduct of a variety of up-sampling filters such as $(C_1 * P'_{11} + C_2 * P'_{21} + C_3 * F_{31} + C_4 * P'_{41})/X$.

Line1
$P''_{1,1} = G_{1,1} \, R_{1,1} \, B_{1,1}$
$P''_{2,1} = G_{2,1} \, R_{2,1} \, B_{2,1}$
$P''_{3,1} = G_{3,1} \, R_{3,1} \, B_{3,1}$
$P''_{4,1} = G_{4,1} \, R_{4,1} \, B_{4,1}$
$P'''_{5,1} = G_{5,1} \, R_{5,1} \, B_{5,1}$
Line 2
$P'''_{1,2} = G_{1,2} \, R_{1,2} \, B_{1,2}$
$P''_{2,2} = G_{2,2} \, R_{2,1} \, B_{2,1}$
$P''_{3,2} = G_{3,2} \, R_{3,2} \, B_{3,2}$
$P''_{4,2} = G_{4,2} \, R_{4,1} \, B_{4,1}$
$P''_{5,2} = G_{5,2} \, R_{5,2} \, B_{5,2}$ Since the full 24 bit synthesized values were not communicated over the interface, the remaining "spare" bandwidth on existing interfaces and cables can be utilized for variety of advantageous benefits. For example, pixel information can be effectively communicated faster. Alternatively, an interface can be mapped to handle an increased byte size or number of bits per Y, Cr and Cb components. For example, a 24 bit interface that used to support 12 bit/pixel video can support an up-sampled pixel of 10 bit Y samples with multiplexed 10 bit Cr and Cb samples.

Figure 2A:
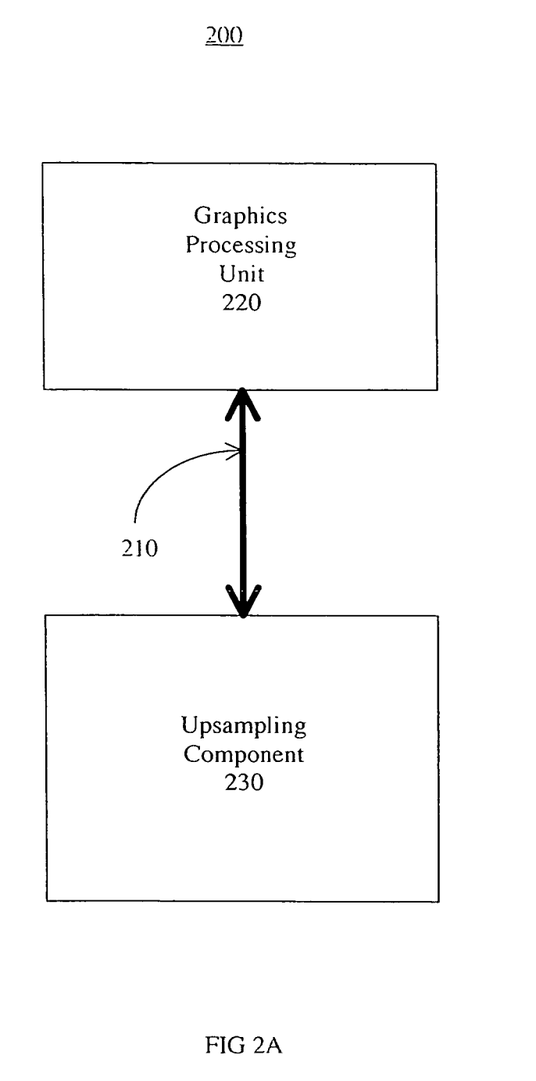
FIG. 2A is a block diagram of an exemplary digital video system in accordance with one embodiment of the present invention.

FIG. 2A is a block diagram of exemplary digital video system 200A in accordance with one embodiment of the present invention. Exemplary digital video system 200A facilitates conservation of bandwidth in digital video data communications between components of the system. In one embodiment, digital video system 200 communicates quasi RGB sub-sampled data between the components of the system. The quasi RGB sub-sampled data can be further compressed in accordance with a variety of compression techniques for additional bandwidth conservation. Digital video system 200A includes bus 210, graphics processing unit 220, and up-sampling component 230. Graphics processing unit 220 and RGB up-sampling 230 are communicatively coupled to bus 210.

The components of digital video system 200A cooperatively operate to perform digital video functions and facilitate conservation of digital video communication bandwidth. Bus 210 communicates quasi-RGB sub-sampled data between graphics processing unit 220 and up-sampling component 230. In one embodiment, interfaces on bus 210 are mapped to quasi-RGB sub-sampled values. Graphics processing unit 220 produces the quasi-RGB sub-sampled data and forwards the quasi-RGB sub-sampled data to bus 210. In one embodiment of the present invention, the graphics processing unit performs color space conversion of sampled chrominance data to produce the quasi-RGB sub-sampled data before forwarding the data to the bus. Up-sampling component 230 receives the quasi-RGB sub-sampled data from bus 210 and performs up-sampling. In one embodiment, the up-sampling produces equally weighted synthesized sampling values (e.g. full 4:4:4 RGB values).

The quasi-RGB sub-sampled data communicated on bus 210 of digital video system 200A shown in FIG. 2A can also be compressed and decompressed further in accordance with a variety of compression techniques. For example, the video information can be further compressed and decompressed in accordance with MPEG, WMV, etc. compression formats.

Is appreciated that the up-sampling module 230 can be implemented in a variety of components. In one embodiment of the present invention the up-sampling module 230 can be included in a display device. For example, up-sampling module 230 can be included in a television (TV), plasma monitor and/or liquid crystal display (LCD).

Figure 2B:
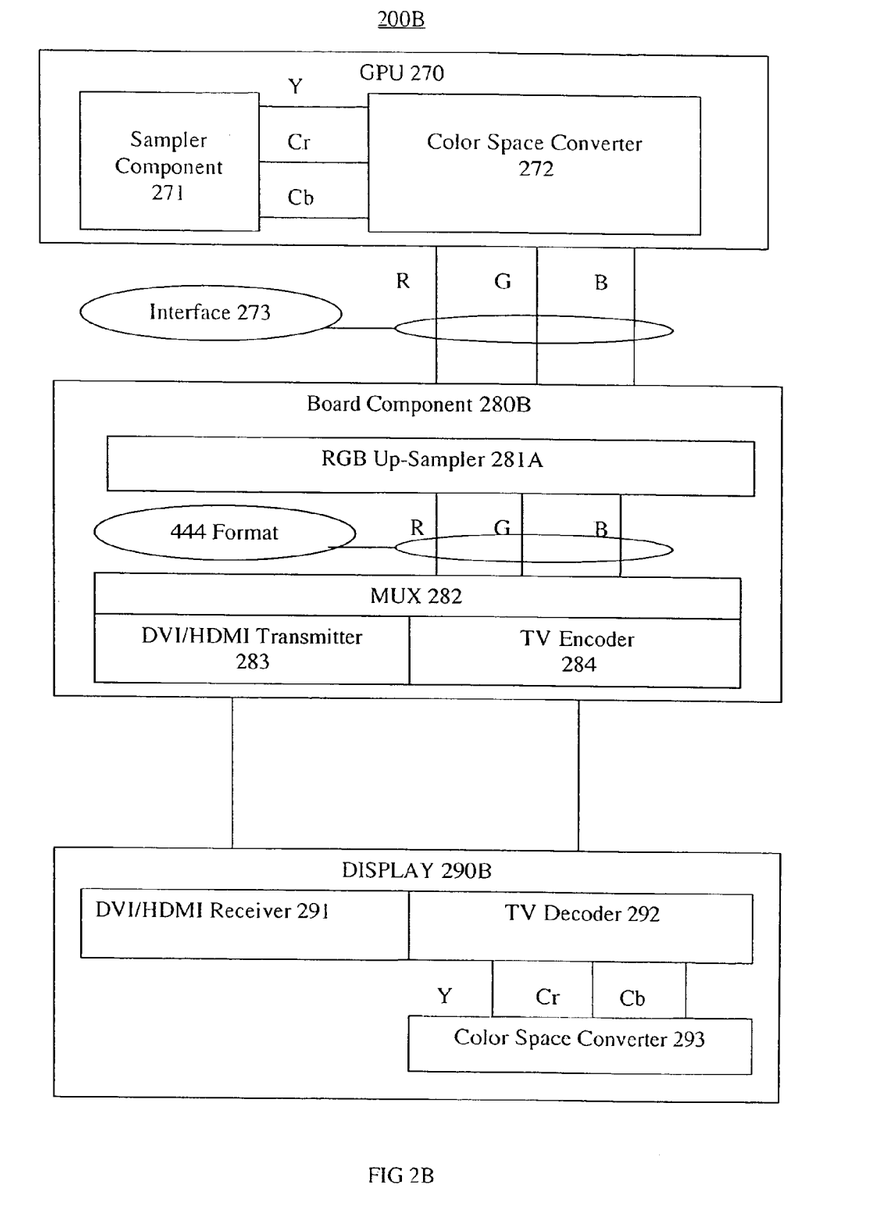
FIG. 2B is a block diagram of an exemplary digital video system in accordance with one embodiment of the present invention in which the up-sampler is included on a board component.

FIG. 2B is a block diagram of an exemplary digital video system 200B in which the up-sampler is included as a board component. Digital video system 200B includes graphics processing unit 270, board component 280B (e.g., another device on a board) and display 29013. Graphics processing unit 270 is communicatively coupled to board component 280B by an interface 273. In one embodiment, the interface is associated a communication bus. Board component 280B is communicatively coupled to display 290B by one or more communication buses. Graphics processing unit 270 includes sampling component 271 and color space converter 272. Board component 280B includes RGB up sampler 281A, multiplexer 282, DVI/HDMI transmitter 283, and TV encoder 284. Display component 290B includes receiver 291, decoder 292 and color space converter 293. Sampled chrominance values are communicated via interface 273 to up sampler 281 and the up-sampling is performed on board component 280B.

In one embodiment, interface 273 is a 24 bit interface upon which 12 bit 4:2:0 quasi RGB sub-sampled information is communicated. The "extra" or freed up spare 12 bits of communication bandwidth of interface 273 is utilized to take advantage of present invention bandwidth conservation. For example, the extra 12 interface bits can be utilized to communicate a portion of the next 12 bit 4:2:0 quasi RGB sub-sampled pixel information effectively increasing the speed at which a plurality of pixels are communicated. The extra 12 interface bits can be utilized to communicate larger component size information. For example, the luminance and chrominance values can be increased from 8 bits per pixel to 10 bits per pixel. The extra 12 interface bits can also be utilized to communicate other information (e.g., metadata).

Figure 2C:
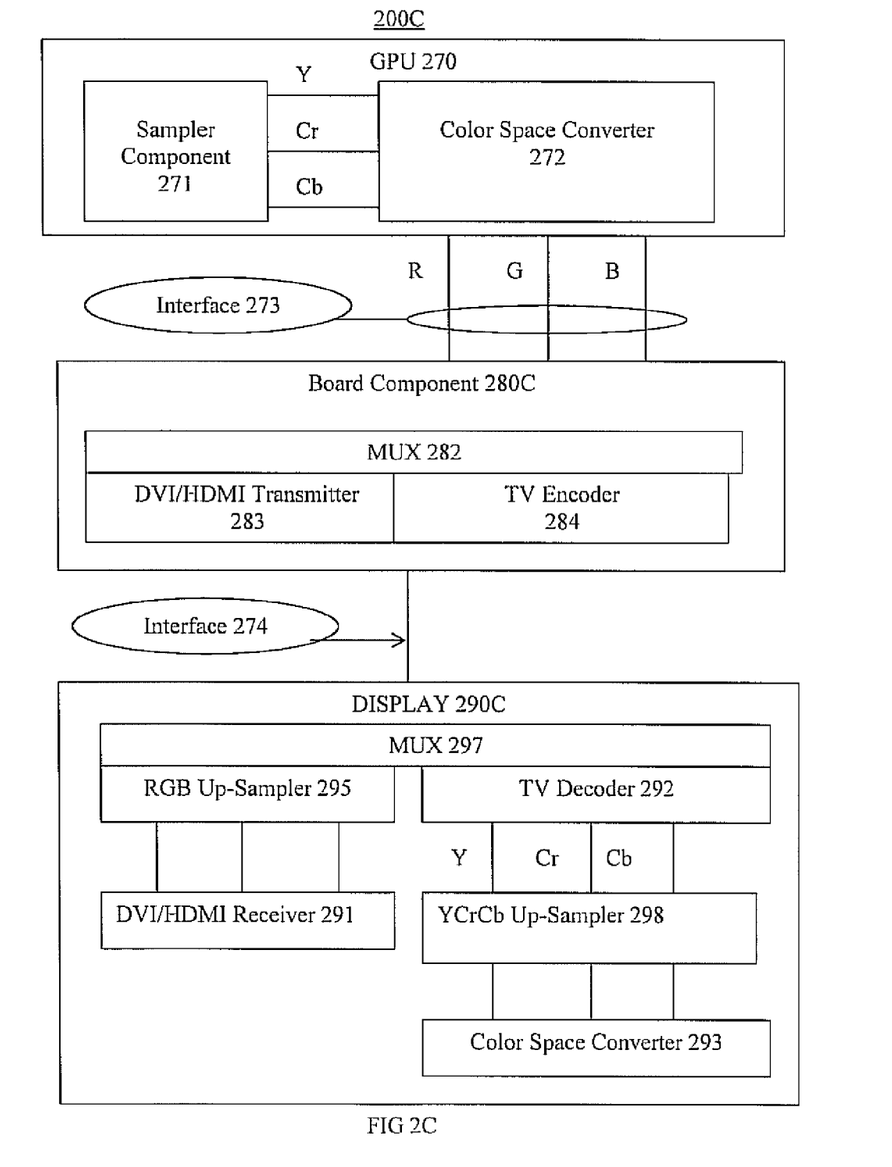
FIG. 2C is a block diagram of an exemplary digital video system in accordance with one embodiment of the present invention in which the up-sampler is included in a display component.

FIG. 2C is a block diagram of an exemplary digital video system 200C in which the up-sampler is included in a display component. Digital video system 200C is similar to digital video system 200B. However, in digital video system 200C sampled chrominance values are communicated on via an interface 274. In one embodiment, the interface 274 is associated one or more buses. Up-sampling is performed in display 290C and not in board component 280C. The sampled chrominance data is forwarded from board component 280C to display 290C. Display 290C is similar to display 290B except display 290C also includes multiplexer 297, up-sampler 295, and up-sampler 298. Similar to digital video system 200B, digital video system 200C permits conservation of bandwidth across interface 273. Digital video system 200C also permits conservation of bandwidth across interface 274 since final up-sampling is performed in the display device 290C.

Figure 3:
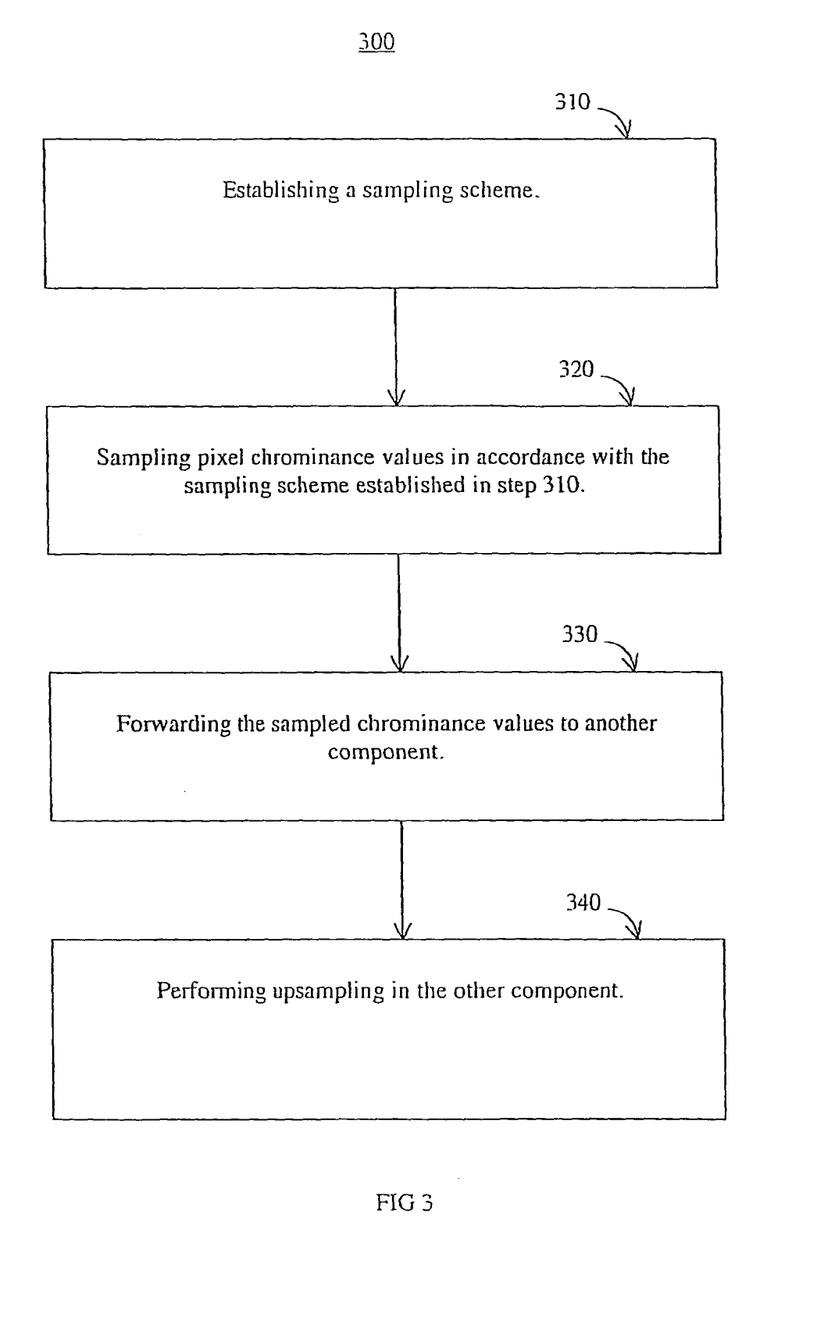
FIG. 3 is a flow chart of an exemplary sampled chrominance communication method in accordance with one embodiment of the present invention.

FIG. 3 is a flow chart of exemplary sampled chrominance communication method 300 in accordance with one embodiment of the present invention.

In step 310, a sampling scheme is established. It is appreciated that a variety of the sampling schemes can be established. For example the sampling scheme can be a 4:2:0 format, a 4:2:2 format, 4:1:1 formats, etc. The sampling schemes can be compatible with digital versatile disc (DVD) formats, high-definition television (HDTV) formats, etc.

In step 320, pixel chrominance values are sub-sampled in accordance with the sampling scheme established in step 310. In one embodiment of the present invention, pixel chrominance values are sub-sampled in a processing unit (e.g., central processing unit, graphics processing unit, etc.).

In step 330, the sub-sampled values are forwarded to a second component. In one embodiment of the present invention, sub-sampled data is compressed before being forwarded. For example, the video information can be further compressed in accordance with MPEG, WMV, etc. compression formats.

In step 340, up-sampling is performed in a second component. If the video information was compressed in step 330 it is decompressed in the second component. In one embodiment the sampled chrominance values are forwarded to a display and the display performs the up-sampling. In one exemplary implementation, the up-sampling produces 444 formatted RGB pixel data.

In one embodiment of sampled chrominance communication method 300, color space conversion is executed before the chrominance values are forwarded as "quasi" RGB sub-sampled values to another component and up sampled.

It is appreciated that the present invention can be implemented in a variety of embodiments. In one exemplary implementation, the present invention can be utilized in processing systems that support a variety of graphics applications including video games. For example, the present invention can be utilized in graphics rendering processes of a game console, personal computer, personal digital assistant, cell phone or any number of platforms for implementing a video game. It is also appreciated that references to video game application implementations are exemplary and the present invention is not limited to these implementations.

Figure 4:
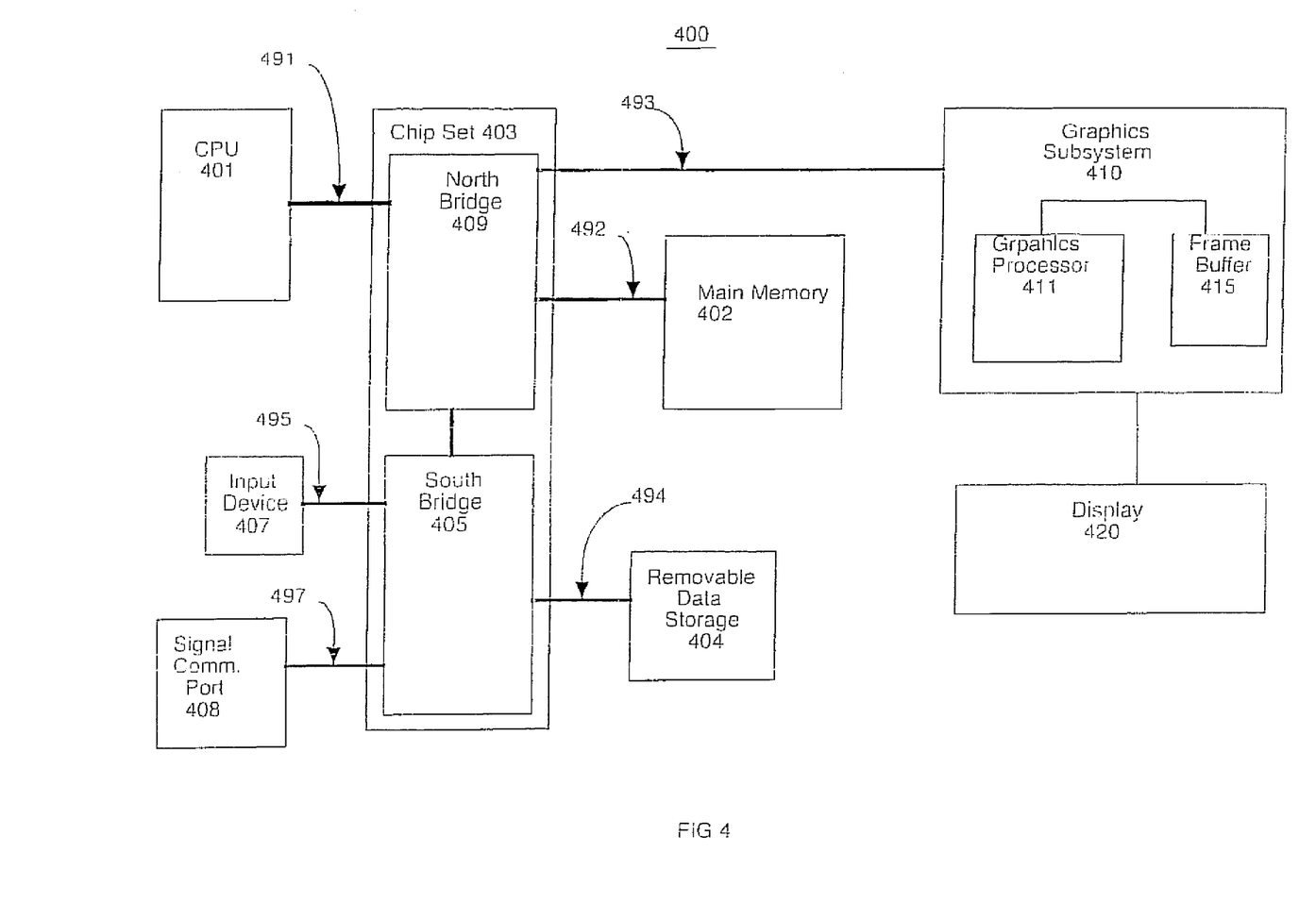
FIG. 4 is a block diagram of exemplary computer system upon which embodiments of the present invention can be implemented.

FIG. 4 is a block diagram of a computer system 400, one embodiment of a computer system upon which embodiments of the present invention can be implemented. In one embodiment of computer system 400, color space converted sub-sampled values are communicated from graphics subsystem 410 to display 420. Display 420 performs "up-sampling" on the color space converted sub-sampled values. Computer system 400 includes central processor unit 401, main memory 402 (e.g., random access memory), chip set 403 with north bridge 409 and south bridge 405, removable data storage device 404, input device 407, signal communications port 408, and graphics subsystem 410 which is coupled to display 420. Computer system 400 includes several busses for communicatively coupling the components of computer system 400. Communication bus 491 (e.g., a front side bus) couples north bridge 409 of chipset 403 to central processor unit 401. Communication bus 492 (e.g., a main memory bus) couples north bridge 409 of chipset 403 to main memory 402. Communication bus 493 (e.g., the Advanced Graphics Port interface) couples north bridge of chipset 403 to graphic subsystem 410. Communication buses 494-497 (e.g., a PCI bus) couple south bridge 405 of chip set 403 to removable data storage device 404, input device 407, and signal communications port 408 respectively. Graphics subsystem 410 includes graphics processor 411 and graphics buffer 415.

The components of computer system 400 cooperatively operate to provide presentations of graphics images. Communications bus 491 through 497 communicate information. Central processor 401 processes information. Main memory 402 stores information and instructions for the central processor 401. Removable data storage device 404 also stores information and instructions (e.g., functioning as a large information reservoir). Input device 407 provides a mechanism for inputting information and/or for pointing to or highlighting information on display 420. Signal communication port 408 provides a communication interface to exterior devices (e.g., an interface with a network). Display device 420 performs up-sampling of color space converted sub-sampled values and displays the resulting information in accordance with the synthetically restored data. Graphics processor 411 processes graphics commands from central processor 401 and provides the resulting data to graphics buffer 415 for storage and retrieval by display monitor 420.

Thus, the present invention facilitates optimized utilization of communication resources and conservation of time. Pixels that are eventually presented are communicated in a sampled format. By efficiently and effectively utilizing communication resources bottlenecks are avoided and end result video images presentation rate is smoother. The present invention permits lower on board bit rates and expense. Conventional hardware interconnects and cabling can effectively communicate more information and conserve bandwidth by communicating present color space converted sub-sampled information. The present invention also facilitates increased communication of information for each pixel. For example, 10 bits per component can be effectively communicated over an 8 bit interconnect.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A digital video communication method comprising:
performing a color space conversion process on chroma sub-sampled information, wherein the chroma sub-sampled information includes results of sampling pixel chrominance values, wherein the output of the color space conversion is quasi-RGB sub-sampled information, including information associated with at least one pixel having less bits per pixel than full display RGB information;
communicating the results of the color space conversion process in a color space converted sampled format via an interface, wherein the interface is mapped to forward at a substantially concurrent time the quasi-RBG sub-sampled information associated with the first pixel and other information; and
performing an up-sampling process after communication, wherein the color space conversion process is performed before the communicating via the interface and before the up-sampling process, the up-sampling process resulting in RGB information with the same number of bits as the full display RGB information per pixel.

2. A digital video communication method of claim 1 wherein said results are communicated in the color space converted sampled format from a graphics processing unit to a display device.

3. A digital video communication method of claim 1 wherein said results are communicated in the color space converted sampled format from a graphics processing unit to another component.

4. A digital video communication method of claim 1 wherein red-green-blue (RGB) pixels are filtered among vertically and horizontally adjacent pixels to match a chrominance up-sampling scheme.

5. A digital video communication method of claim 1 wherein color space conversion is performed in a processing module performing the sub-sampling process and the up-sampling is performed in another processing module.

6. A digital video communication method of claim 1 wherein a communication interface is mapped to forward an increased number of bits per luminance and chrominance in a byte.

7. A digital video system comprising:
an interface for communicating sub-sampled color space converted data, wherein the sub-sampled color space converted data includes quasi-RGB sub-sampled information, including information associated with at least one pixel having less bits per pixel than full RGB information, wherein said quasi RGB sub-sampled information includes information associated with a first pixel and a second pixel and said interface is mapped to forward at a substantially concurrent time said quasi-RBG sub-sampled information associated with said first pixel and at least a portion of said quasi-RGB sub-sampled information associated with said second pixel not included in said information associated with said first pixel;
a graphics processing unit for producing the sub-sampled color space converted data and forwarding the sub-sampled color space converted data to the interface, wherein the graphics processing unit performs color space conversion of the sub-sampled chrominance data before forwarding the sampled chrominance data to the interface; and
an up-sampling component for receiving the sampled color space converted data from the interface and performing up-sampling, wherein the color space conversion is performed before said communicating via said interface and before said up-sampling.

8. A digital video system of claim 7 wherein the up-sampling component is in a display component.

9. A digital video system of claim 7 wherein sampled chrominance data communicated on the interface is also compressed.

10. A digital video system of claim 7 wherein interfaces on the interface are mapped to the sampled chrominance values.

11. A digital video system of claim 7 wherein the up-sampling produces equally weighted synthesized resolution values.

12. A sampled chrominance communication method comprising:
establishing a sampling scheme;
sampling pixel chrominance values in accordance with the sampling scheme;
performing a color space conversion on chroma sub-sampled information resulting in quasi RGB sub-sampled values, wherein the chorma sub-sampled information includes at least a portion of results of sampling pixel chrominance values,
forwarding the sampled chrominance values to another component as quasi RGB sub-sampled values via an interface, wherein the quasi RGB sub-sampled have less bits per pixel than full RGB information, wherein the interface is mapped to forward at a substantially concurrent time the quasi-RBG sub-sampled information associated with the first pixel and other information;
performing up-sampling in the other component, wherein the color space conversion and the forwarding are performed before the up-sampling; and
executing color space conversion before the up-sampling.

13. A sampled chrominance communication method of claim 12 wherein the sampled chrominance values are forwarded to a display and the display performs the up-sampling.

14. A sampled chrominance communication method of claim 12 wherein the sampling scheme is a 4:2:2 format.

15. A sampled chrominance communication method of claim 12 wherein the sampling scheme is a 4:2:0 format.

16. A sampled chrominance communication method of claim 12 wherein the up-sampling produces 4:4:4 formatted RGB pixel data.

17. A sampled chrominance communication method of claim 12 further comprising compressing the sampled chrominance data before forwarding the sampled chrominance data and before performing the up-sampling.

18. A sampled chrominance communication method of claim 12 wherein the sampling scheme is a 4:1:1 format.

* * * * *